United States Patent [19]
Edelstein et al.

[11] Patent Number: 5,484,985
[45] Date of Patent: Jan. 16, 1996

[54] RADIOFREQUENCY GROUND HEATING SYSTEM FOR SOIL REMEDIATION

[75] Inventors: William A. Edelstein, Schenectady; Icko T. Iben, Scotia; Otward M. Mueller, Ballston Lake; Egidijus E. Uzgiris, Schenectady, all of N.Y.; Peter B. Roemer, North Andover, Mass.

[73] Assignee: General Electric Company, Schenectady, N.Y.

[21] Appl. No.: 291,260

[22] Filed: Aug. 16, 1994

[51] Int. Cl.$^6$ .............................. H05B 6/54; E21B 36/04
[52] U.S. Cl. ...................... 219/772; 219/780; 166/60; 166/248
[58] Field of Search ........................ 219/772, 778, 219/779, 780; 166/248, 60; 204/157.15

[56] References Cited

U.S. PATENT DOCUMENTS

| | | | |
|---|---|---|---|
| 4,470,459 | 9/1984 | Copland | 166/248 |
| 4,670,634 | 6/1987 | Bridges et al. | 219/772 |
| 4,956,582 | 9/1990 | Bourassa | 333/25 |
| 5,152,341 | 10/1992 | Kasevich | 166/248 |
| 5,236,039 | 8/1993 | Edelstein et al. | 166/248 |

*Primary Examiner*—Philip H. Leung
*Attorney, Agent, or Firm*—Lawrence P. Zale; Marvin Snyder

[57] ABSTRACT

An in-situ method of extracting contaminants from a soil volume comprises applying a radiofrequency (RF) excitation signal to heat the soil with an array of electrodes. The electrodes are inserted into the contaminated volume or inserted into a matrix of holes drilled into the volume. A first row of electrodes is electrically coupled to a shield of a coaxial cable, with a second row electrically coupled to the central conductor of the coaxial cable. RF energy is applied to pairs of electrode rows through the coaxial cable and a matching network is installed in front of the electrode-row pair to maximize power flow into the electrode-row pair. This results in very evenly distributed voltages which results in even heating. A balanced-to-unbalanced transformer (balun) is installed at the input to the matching network to prevent the deposition of RF energy outside the target volume and creation of voltages that could be hazardous to personnel. The electrodes are perforated and connected to collection tubes which collect volatilized contaminant vapors and pass the vapors to a vapor treatment unit for neutralization.

6 Claims, 6 Drawing Sheets

RADIOFREQUENCY GROUND HEATING SYSTEM FOR SOIL REMEDIATION

BACKGROUND OF THE INVENTION

1. Field of the Invention

This invention relates to removal of contaminants from soil, and more specifically, the use of radiofrequency (RF) ground heating to remove contaminants from soil in-situ.

2. Description of Related Art

Bridges and Taflove of the Illinois Institute of Technology Research Institute (IITRI) proposed mining a shaft through material above oil shale, known as overburden, to the top of the oil shale and inserting an array of electrodes into the oil shale starting from this shaft. This method for RF heating of oil shale is described in U.S. Pat. No. 4,449,585, "Apparatus and Method For In-situ Controlled Heat Processing of Hydrocarbonaceous Formations" by J. Bridges and A. Taflove issued Mar. 22, 1984. Their electrode array is designed to be a "triplate," where the center electrode row is at high potential and the adjacent rows on either side at ground potential.

A somewhat different method of RF shale heating utilizes an array of specially designed dipole antennas inserted into the ground, described in U.S. Pat. No. 4,140,179, "In-situ Radio Frequency Selective Heating Process" by R. S. Kasevich, M. Kolker and A. S. Dwyer issued Feb. 20, 1979. A problem with this approach is that the antenna elements must be matched to the electrical conditions of the surrounding formation. As the formation is heated, the electrical conditions can change, and the dipole antenna elements have to be removed and changed, which presents significant practical and economic difficulties.

The triplate RF electrode arrangement was applied to contaminated soil as described in "Test of Radio Frequency In Situ Heating for Treatment of Soil at Rocky Mountain Arsenal" by R. Snow, G. Sresty, C. Conroy R. Collins, and T. Kilgannon, H. Der, J. Enk, J. Bridges, Proceedings of the XIV Superfund Conference, Nov. 30–Dec. 2, 1993, Washington, DC ("Superfund report"). This report describes the removal of organic contaminants from soil in situ by heating soil with RF antennas and power amplifiers. The PCBs are volatilized and then collected at the surface of the soil for disposal by a number of methods, for example catalytic combustion or adsorption on activated charcoal.

It is asserted in the Superfund report, id. that the "triplate" has the center row at a high electrical potential and the outer electrode rows at "ground" potential. However, since the triplate array is at the end of some length of RF cable and other wires, all the electrodes (center row and outside rows) will have sinusoidally varying voltages consistent with maintaining some average voltage. Since all electrodes will have a fluctuating voltage, it is likely that these voltages will cause currents to flow to other ground points, for example at the control station, which would produce voltages that can pose a hazard to operating personnel. The triplate arrangement depends on symmetry to prevent such Currents, and such symmetry is easily broken.

Another problem with the triplate is its method of feeding, which is via wires originating in a single feed point as shown in U.S. Pat. No. 4,449,585 mentioned above. Since the feed wires have different lengths and therefore different, significant inductive reactances, the voltages at various electrodes will vary and will produce uneven currents and consequent uneven heating.

Currently there is a need for a safe and efficient method of using RF energy to remove contaminants; from soil.

SUMMARY OF INVENTION

A system for extracting contaminants in-situ from a contaminated volume employs a master oscillator for producing a fundamental frequency, a plurality of radiofrequency (RF) heating sources, an RF electrical network to optimize transmission of energy to the RF heating sources, and a vapor collection and treatment system to collect and render harmless organic or other harmful vapors generated by heating the soil. The heating sources are conductive electrodes situated in a rectangular pattern in the contaminated volume. An RF amplifier provides a radiofrequency excitation signal that is transmitted through a shielded coaxial line to a set of electrodes located in the contaminated volume of soil. The shielded line is connected through a balun to a tuning and matching network which optimizes the transmission of RF power to the contaminated volume. The balun prevents currents through stray paths that may waste RF power by heating outside the target volume and that could create voltages which could be hazardous to personnel operating the contamination extraction system. The electrodes cause currents to flow in a contaminated volume of soil, thereby depositing RF energy that heats the soil and causes contaminants to be vaporized. The electrodes are perforated and serve as collection wells through which contaminant vapors are drawn in addition to their function as heat sources. The vapor drawn through the electrodes is condensed, collected or destroyed by thermal or catalytic oxidation.

OBJECTS OF THE INVENTION

It is an object of the present invention to provide an in-situ method of removing volatile contaminants from soil which is more efficient than conventional methods.

It is another object of the present invention to provide an in-situ method of removing volatile contaminants from soil with RF energy which is safer than conventional methods.

It is another object of the present invention to provide an in-situ method of removing volatile contaminants from soil with RF energy which more efficient than conventional methods.

It is another object of the present invention to provide an in-situ method of removing volatile contaminants from soil with RF energy requiring reduced electrical energy as compared with conventional methods.

It is another object of the present invention to provide an in-situ method of removing volatile contaminants from soil with RF energy in the presence of a water table close to the surface.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

DETAILED DESCRIPTION OF THE INVENTION

In radiofrequency (RF) heating for soil remediation, RF energy can be deposited in a target volume, away from a heat source in a manner not limited by the thermal conductivity of the formation. In this regard, heat is transported away from RF electrodes both by RF heating and also by thermal conduction.

Figure 1:
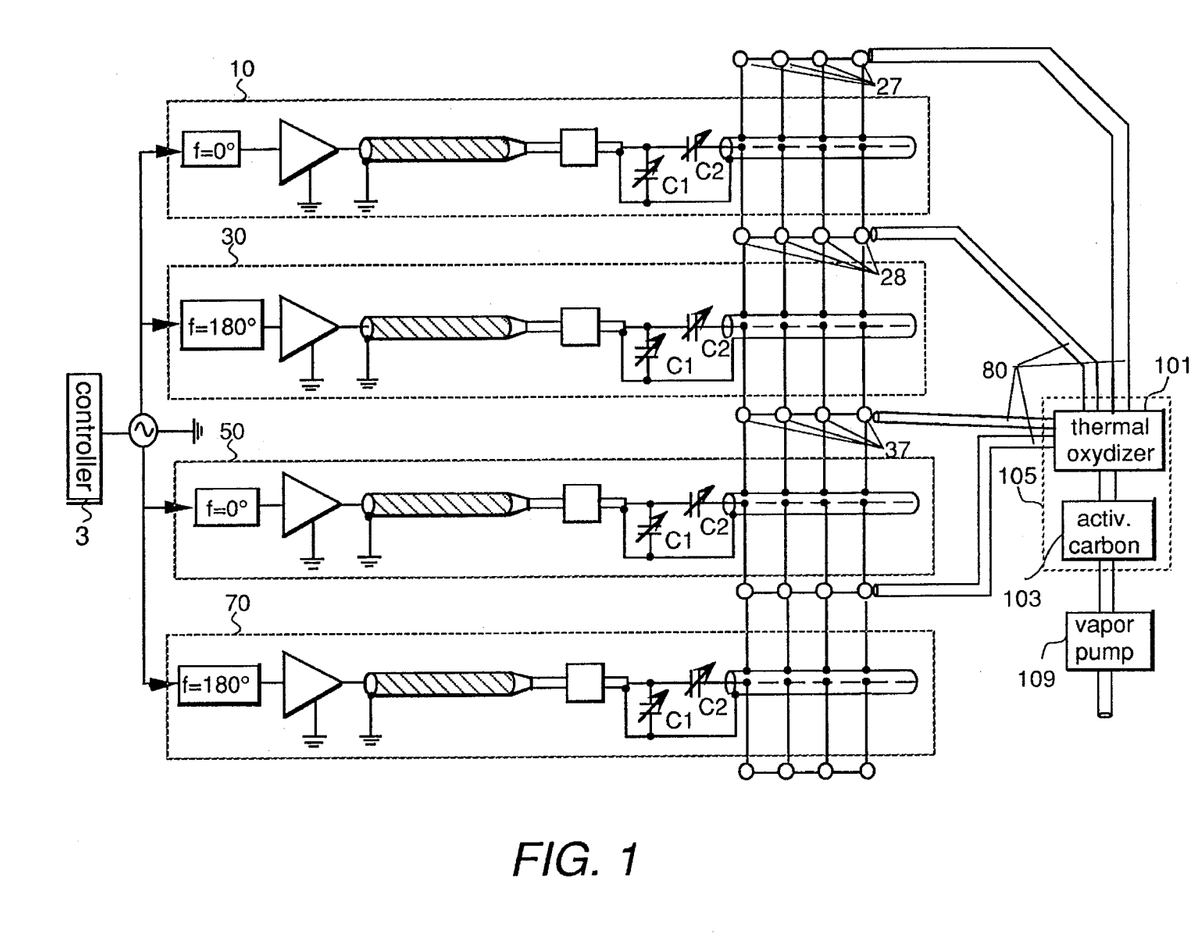
FIG. 1 is a simplified block diagram of a first embodiment radiofrequency (RF) ground heating system according to the present invention where adjacent RF amplifier means share a common row of electrodes.

In FIG. 1, a contaminant extraction system according to a first embodiment of the present invention is shown having a plurality of RF heating branches 10, 30, 50, 70 which provide heat to a contaminated volume of soil. The RF heating branches share rows of electrodes 27, 28, 37. The electrodes dissipate RF energy into the contaminated soil causing heating of the soil and contaminants, thereby causing the contaminants to become vaporized. The electrodes preferably are pipes with perforations in the portion underground. The electrodes are connected to a set of collection tubes 80 such that contaminant vapors may be drawn from the soil, through the electrodes through collection tubes 80, and into an appropriate vapor treatment unit 105. Vapor treatment may be, for example a thermal oxidizer 101 or a catalytic oxidizer which oxidizes contaminant vapors into a harmless material. Activated carbon may also be used to adsorb, and trap the contaminant vapors. The vaporized contaminants can be drawn away from the soil by a negative pressure applied by one or more vapor pumps 109.

Figure 2:
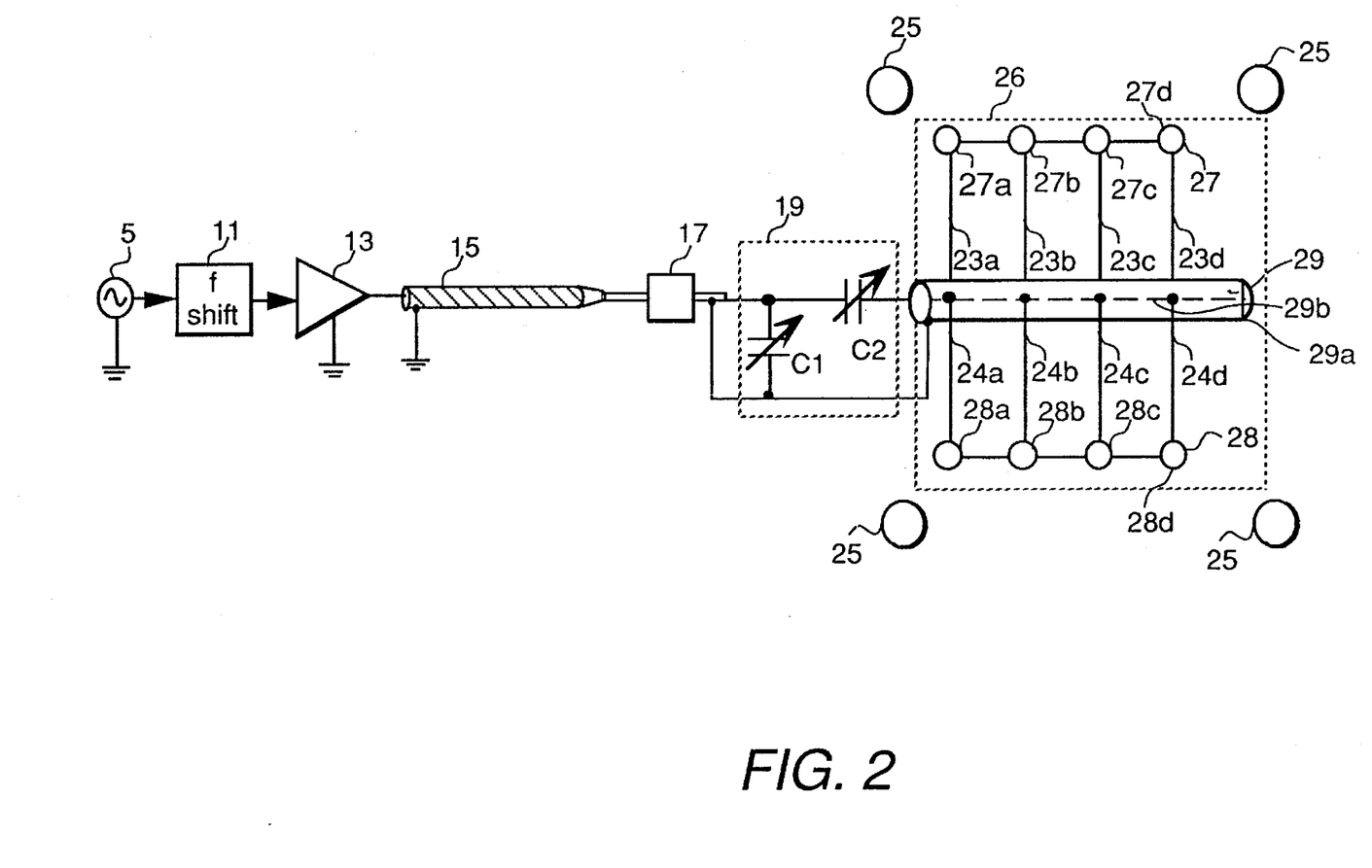
FIG. 2 is a schematic diagram of a single RF heating branch of the contaminant extraction system of FIG. 1.

FIG. 2 is a more detailed illustration of RF heating branch 10 of FIG. 1. One or more master oscillators 5 (only one is shown), provide a reference signal. Master oscillator 5 feeds a low-power (typically milliwatts to a few watts) radiofrequency (RF) signal at a fundamental frequency $\omega$ to a phase shifting circuit 11. Master oscillator 5 in this case operates at 6.78 MHz, which frequency is chosen because it is an "ISM" (industrial, scientific and medical) band which is clear of communications and therefore allows usage with reduced concern for interference with RF broadcasts and other RF applications.

Phase shifting circuit 11 shifts the phase by a desired amount and provides the signal to an RF power amplifier 13 whose output is a high-power signal (typically tens to hundreds of kilowatts, in this case, 50 kW). The phase shifting circuit can be, for example, a length of cable or a simple inverting circuit if it is desired to change the phase by 180°.

The high-power RF energy is transmitted through a coaxial cable 15 to the vicinity of the contaminated volume of soil. A 50 ohm coaxial cable was preferred. A balanced/unbalanced compensation unit ("balun") 17 prevents stray currents which could produce deposition of power outside the contaminated volume and cause voltages that are hazardous to personnel operating the contaminant extraction system.

The RF energy is then passed from balun 17 to a matching network 19 which is connected to the electrode array 26. Matching network 19 coupled between balun 17 and a second coaxial cable 29 is adjusted to alter the overall conductance and resistance to maximize the power flow into the contaminated volume through the electrode array 26.

The RF energy passes into a coaxial cable 29 that distributes the RF energy to the electrodes 27a–27d, 28a–28d. Coaxial cable shield 29a is electrically connected to 27a–27d on one side. Central conductor 29b is electrically connected to electrodes 28a–28d on the other side. The connection to coaxial cable center conductor 29b is made through a hole cut through coaxial cable shielding 29b.

Coaxial cable 29 is a simple and convenient way to improve the uniformity of the voltage applied to the electrode rows. The impedance through coaxial cable 29 is relatively low compared to the impedance through feed connections 23a–23d and 24a–24d which connect coaxial cable shield 29a, and central conductor 29b to the electrode rows 27, 28, respectively. The voltages at the feed connection to coaxial cable 29 will thus be fairly constant so that the voltages applied to the electrodes are all the same. This results in relatively constant voltages being applied to all electrodes. This also results in even heating of contaminated soil 2.

If feed connections 23a–23d and 24a–24d were attached directly to matching network 19 and ran to the electrode rows, then the inductances of the connections along the electrode rows and the consequent currents between electrode rows would cause the voltages and currents to decrease for electrodes further from matching network 19.

Coaxial cable 29 may be extended beyond the end of the electrode rows to take advantage of wavelength effects to improve the uniformity of voltages applied to the electrode rows.

The electrode rows are positioned substantially closer than a wavelength and the electrodes within each row are spaced substantially closer than the row spacing. Typical spacing is 1 m between electrodes within a row and 2 m between rows. With this arrangement, the rows act approximately as sheet sources and the heating of the region between rows is uniform as described in U.S Pat. No. 4,449,585, Bridges et al., mentioned above.

The electrodes of array 26 of FIG. 2, in the preferred embodiment, are stainless steel pipes of diameter 2 inch to 4 inch with a large number of holes drilled in them to allow vapors to pass into them.

Figure 3:
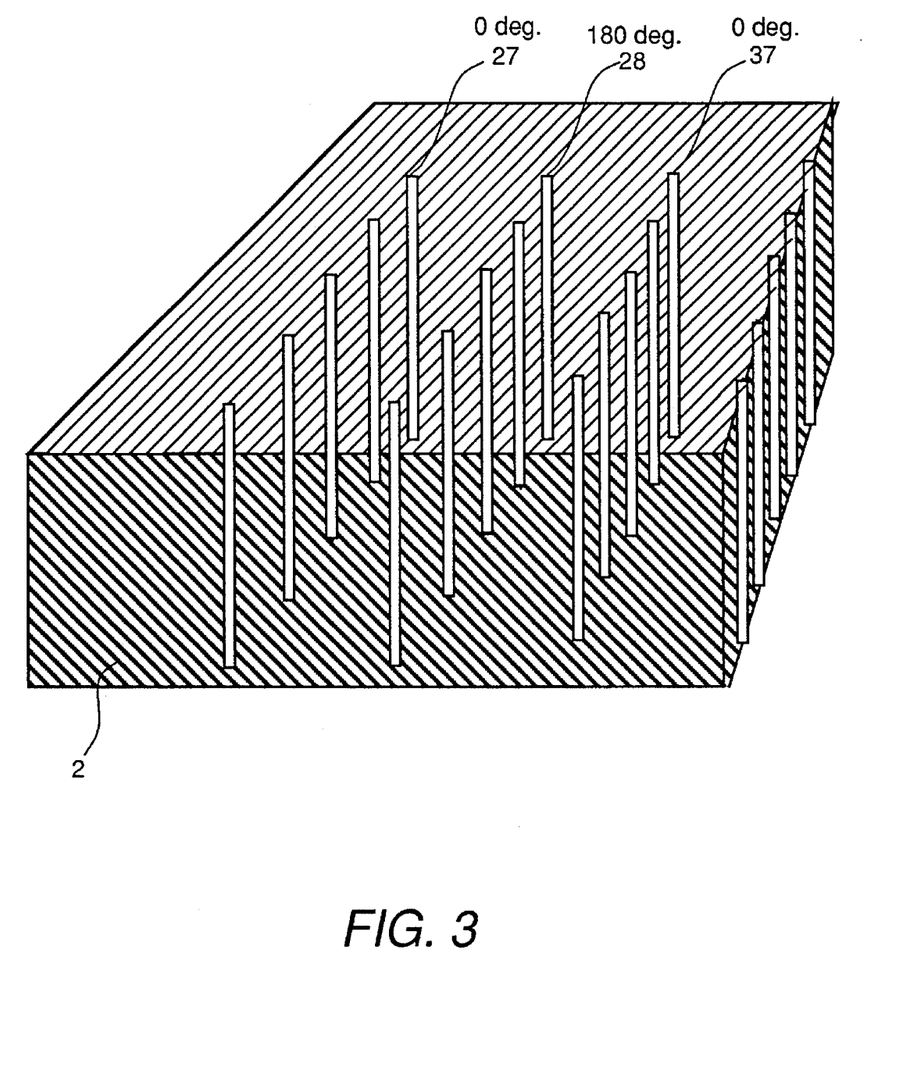
FIG. 3 is a perspective three-dimensional view of the placement of only the electrodes of the present invention as they would appear in-situ.

FIG. 3 shows adjacent rows of electrodes, 27, 28, 37 of FIG. 1 as they would appear in-situ. The electrodes are positioned such that RF energy is dissipated in the contaminated soil 2. The phase of each adjacent row is 180° different from adjacent rows.

The matching network 19 coupled between coaxial cable 29, and balun 17 of FIG. 2, is adjusted to alter the overall conductance and resistance to maximize the power flow into the contaminated volume of soil through the electrode array 26.

Water is the single most important energy sink in the soil because of its very large latent heat of vaporization. It is therefore desirable to eliminate as much water as possible, especially if there is a local water table above or near the bottom of the contaminated volume and the associated electrode array. To this end, dewatering wells 25 are installed around the perimeter or inside the contaminated volume. These wells should be substantially deeper than the depth of the volume to be treated, and water seeping in is pumped away, thereby causing a local depression of the water table. The wells are arranged to depress the water table well below the contaminated volume. Dewatering is extremely important if it is desired to raise the contaminated volume temperature above 100° C., the boiling point of water. Otherwise, the heat from the deposited RF energy may simply go into boiling water in the ground and never get the soil beyond 100° C.

RF power amplifier 13 can be based on vacuum tubes or solid-state power transistors. Vacuum tube amplifiers, however, are generally limited to 60% to 70% electrical efficiency, are expensive and tend to be unreliable. Inefficiency also creates a need for expensive, clumsy and inconvenient air- or water-cooling. Solid-state devices can be used to produce amplifiers which are considerably cheaper and are much more reliable as is evident from the reliability of modern electronics in radio and television receivers, computers and other electronic consumer products, many of which were formerly made using vacuum tubes. Solid-state power devices operate with a power supply of a few hundred volts whereas vacuum tubes for high-power applications require power supply of many kV (thousands of volts), which high voltage tends to stress electronic components such as transformers and capacitors.

Figure 4:
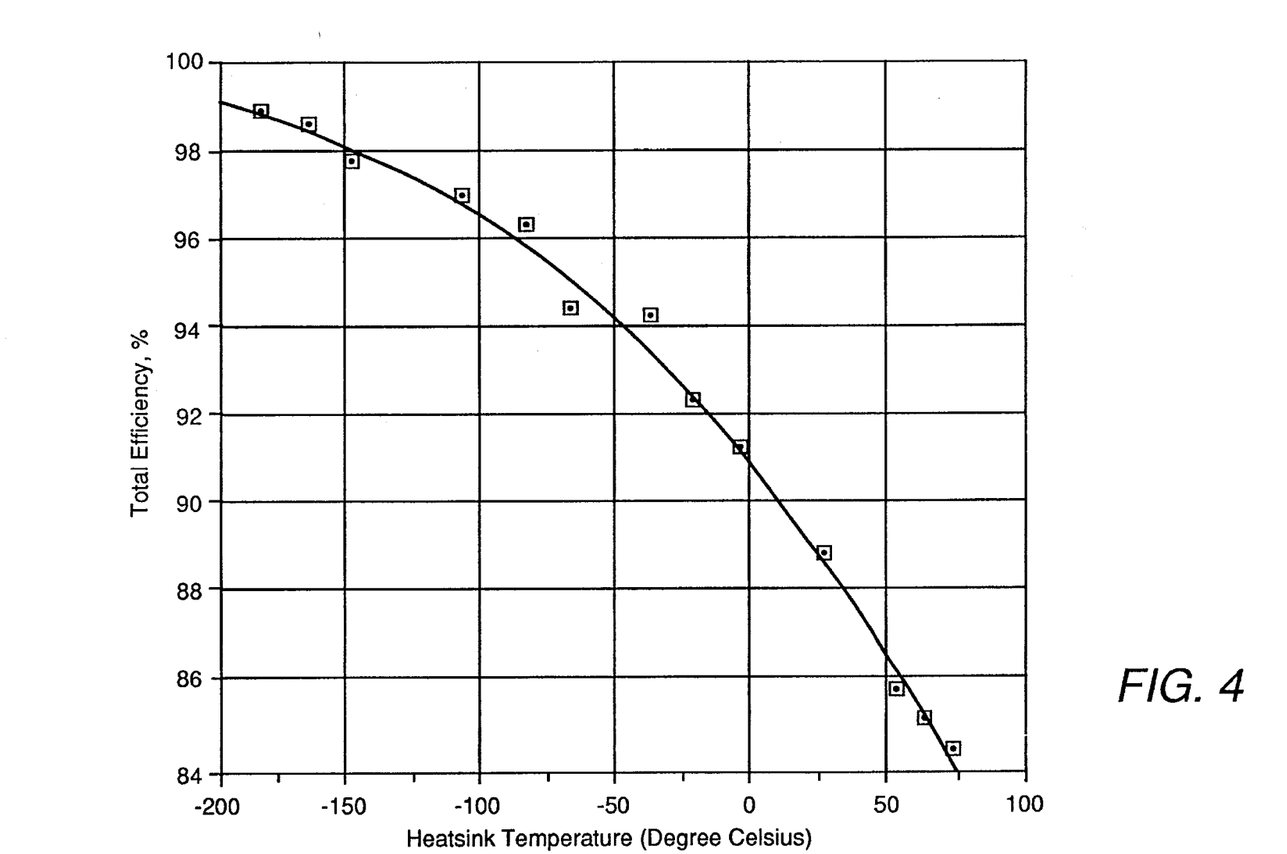
FIG. 4 is an efficiency vs. temperature graph for a solid-state, class-E RF amplifier.

It should be possible to make "class-D" or "class-E" solid state amplifier modules that can be produced at a cost of $0.20 to $0.40 per watt with an electrical efficiency around 90%. In order to increase efficiency, RF amplifiers 13 may be cryogenically cooled amplifiers, such as MOSFET power transistors. FIG. 4 shows the total efficiency of a 1 kW, Class-E, two-transistor module which is nearly 90% at room temperature and 99% at 77 K. A more detailed discussion is provided in "Ultra-high efficiency power conversion using cryogenic MOSFETs and high-temperature superconductors" by O. M. Mueller and K. M. Herd, 24th annual IEEE Power Electronics Specialists Conference, Jun. 20–24, 1993, Seattle, Wash., PESC-93 Record, pp 772–778, IEEE 93CH-3293-8, 1993.

Small solid-state RF amplifier modules, powered by low voltages (a few hundred volts), capable of a few kW to tens of kW, can have their RF output combined to produce high power. It may be important to have available amplifiers of a particular size to optimize the cost-effective application of RF power. For example, as RF power is increased, it becomes necessary at certain power levels to increase the size and weight of coaxial lines, capacitors and other RF components. The cost of these more ragged RF components tends to increase rapidly so that the RF components associated with two circuits of lower power may be cheaper than the RF components associated with a circuit whose power is equal to the sum of the two lower power RF circuits. In some cases, wavelength effects which may tend to cause uneven distribution of RF energy to the ground at the electrodes can be alleviated by using smaller electrode groups powered by smaller RF amplifiers. Solid-state amplifiers which are efficient (need minimal cooling), need an AC or DC power supply of a few hundred volts and are robust are essential for a system which uses a number of amplifiers and distributes them over the contaminated area.

According to the laws of electromagnetism, a current traveling down the center conductor of a coaxial line is associated with an equal but opposite current traveling on the inside of the coaxial shield. Thus the current on the center conductor and the current on the inside of the coaxial shield form a balanced pair. However, other, unbalanced, currents can be carried on the outside of the coaxial line; these currents can lead to deposition of RF power outside the target volume and to voltages and currents which endanger operating personnel; these currents are minimized by the use of a balun.

Figure 5:
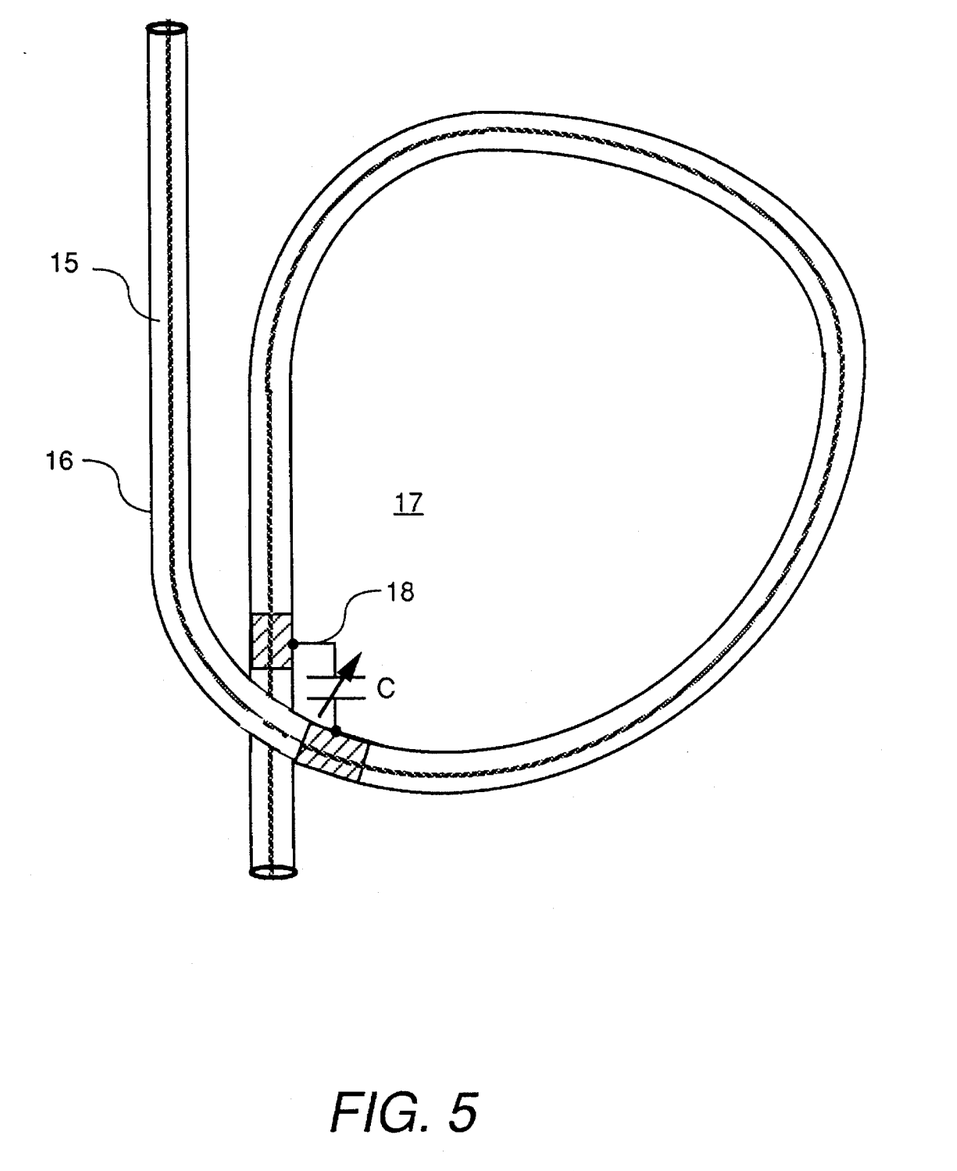
FIG. 5 is an illustration of the RF balun according to the present invention.

FIG. 5 is a more detailed diagram showing the construction of balun 17 of FIG. 2. Balun 17 greatly reduces unbalanced currents on the outside of coaxial shield 16. Balun 17 is comprised of a section of insulated coaxial cable 15 coiled one or more times such that its outer shielding 16 of its coiled length has an inductance L. A variable capacitor 18 of value C is electrically connected between portions of the shielding 16 at ends of the coil. The capacitance C and inductance L of the shield of the coiled coaxial cable form a parallel resonant circuit of resonant frequency $\omega_b = 1/\sqrt{(LC)}$. If a resonant circuit has a quality factor Q, the parallel impedance at resonance is real with a value $R_p = Q \omega L$. For a low-loss circuit, Q will be in the range of 50 to a few hundred, so $R_p$ will be large. Coiled cable balun 17 is inserted into the RF transmission chain between the coaxial lines 15 coming from the RF power amplifier 13, and the matching network 19 as shown in FIG. 1. When balun 17 resonant frequency $\omega_b$ is equal to the operating frequency $\omega$, the parallel resonant circuit presents a high impedance to the transmission of unbalanced current along the outer skin of the coaxial shielding, due to the $R_p$ value.

In practice, balun 17 can be adjusted and its operation optimized using a field intensity meter (Holaday Industries, Eden Prairie, Minn.) to measure the magnetic field outside part of the coaxial line leading to the balun. A coaxial line in which the power is perfectly balanced will not produce an external magnetic field. However, an unbalanced transmission with current flowing on the outside of the coaxial shield does produce an external magnetic field. Balun 17 is inserted into the transmission chain and adjusted to minimize the external field as monitored by the field intensity meter. Tuning of balun 17 is optimized in this way as the effects of stray capacitance is automatically taken into account because the stray currents are minimized. In the present invention, balun 17 was constructed using a 2-cm coaxial line with one turn about 1 m diameter. It's inductance was approximately 2.7 μH which can be tuned to 6.8 MHz by approximately a 200 pF capacitor, which is an attainable value. In our experiments in the field, tuning the balun reduced stray RF power by a factor of 100.

Typical RF excitation signal frequencies range from 0.1 to 100 MHz, although 1–10 MHz is preferred, depending on the electrical properties of the contaminated volume.

Figure 6:
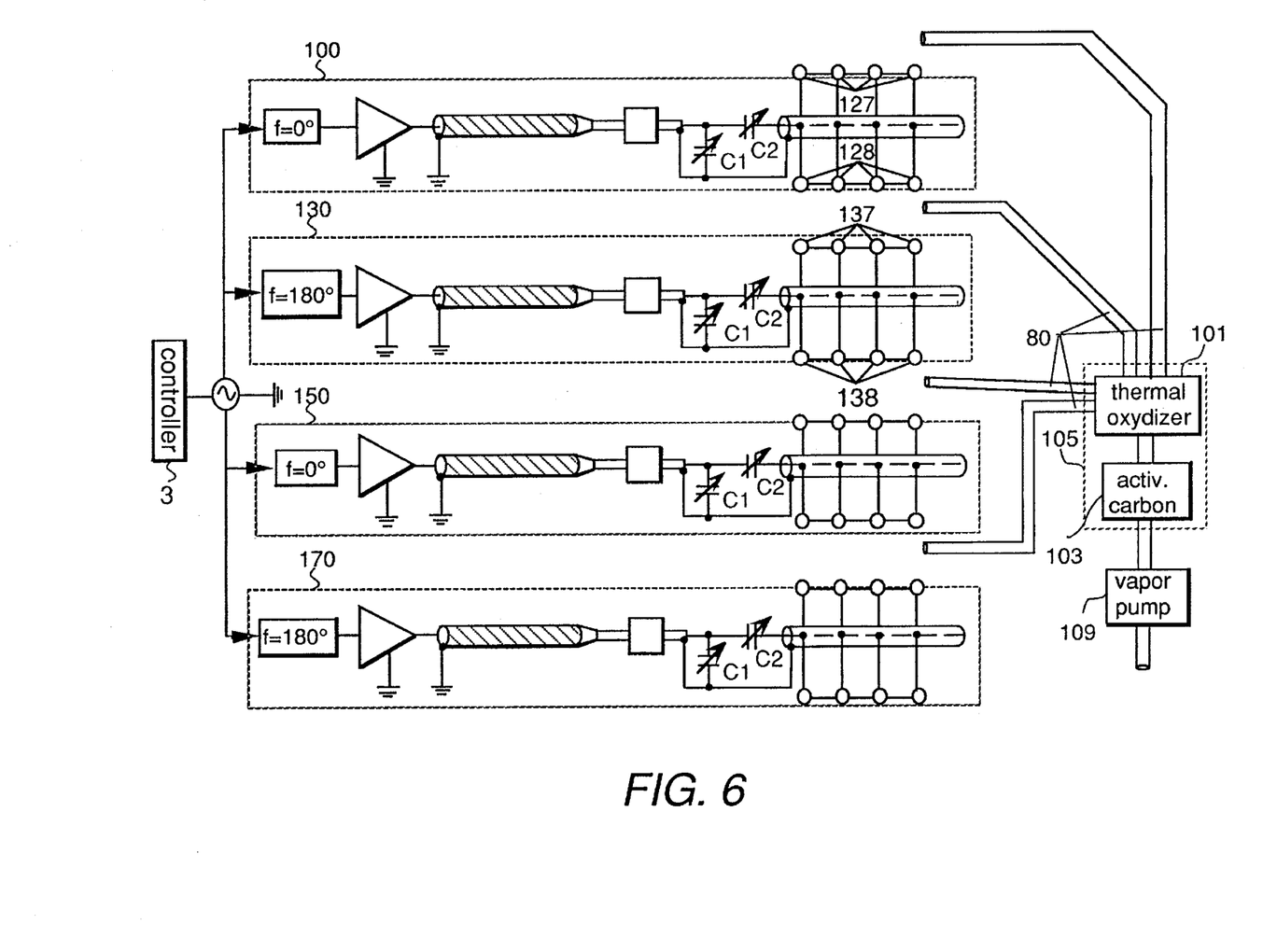
FIG. 6 is a simplified block diagram of a second embodiment of an RF ground heating system according to the present invention.

FIG. 6 is another embodiment of the present invention. This embodiment functions as described just as the previous embodiment shown in FIG. 1 with the exception that the RF heating branch do not connect to rows of electrodes of adjacent branches. Electrode rows 127, 128 of RF heating branch 110, have no electrical connection to rows 137, 138 of RF heating branch 130. This allows independent operation of each RF heating branch. Collection tubes 80 are connected to the electrodes, which have perforations in them, to draw vapors through the electrodes and into a vapor treatment unit 105, as in FIG. 1.

While several presently preferred embodiments of the novel system have been described in detail herein, many modifications and variations will now become apparent to those skilled in the art. It is, therefore, to be understood that the appended claims are intended to cover all such modifications and variations as fall within the true spirit of the invention.

What is claimed is:

1. A contaminant extraction system for vaporizing and removing contaminants in-situ from a volume of contaminated soil comprising:

a) a master oscillator for producing a fundamental frequency signal; and b) a plurality of heating sources, each comprising:

radiofrequency (RF)amplifier means, for providing a RF excitation signal based upon the fundamental frequency signal to energize electrodes, a first coaxial cable coupled at a first end to the RF amplifier means, a balanced-to-unbalanced (balun) transformer, coupled to the first coaxial cable to create an impedance in the shielding of the first coaxial cable, substantially preventing the flow of unbalanced currents in shielding of the first coaxial cable, a plurality of perforated electrodes arranged in said contaminated soil into a first and second row which cause heating of said contaminated soil when energized, and causing the contaminant to become vaporized the perforated electrodes being hollow to receive and guide the contaminant vapors out of the contaminated soil, a matching element coupled to the first and second rows of electrodes, and the balun for maximizing RF energy deposited into the contaminated soil when they receive the RF excitation signal, a second coaxial cable coupled to the matching element having a shielding and a central conductor, a plurality of first coupling lines having substantially equal impedance each coupling an electrode of the first row to the shielding of the second coaxial cable, and a plurality of second coupling lines having substantially equal impedance, and substantially the same impedance as each of the first coupling line, each second coupling line coupling an electrode of the second row to the central conductor of the second coaxial cable.

2. The contaminant extraction system as recited in claim 1 wherein the electrodes are perforated and further comprises:

a) vapor collection means connected to the perforated electrodes for drawing contaminant vapor through the electrodes when a negative pressure is applied to them; and b) a vapor pump to apply a negative pressure to the perforated electrodes.

3. The contaminant extraction system as recited in claim 1 further comprising a phase shifter coupled between the master oscillator for receiving the fundamental frequency and providing a desired phase shift causing adjacent electrode-rows to radiate a signal shifted by the desired amount.

4. The contaminant extraction system as recited in claim 1 further comprising dewatering wells positioned in the vicinity of the perforated electrodes in order to reduce an amount of water around the electrodes and enable more efficient heating.

5. The contaminant extraction system as recited in claim 1 wherein RF amplifier means is a cryogenically cooled power amplifier.

6. A method of extracting volatile contaminants from a soil volume in-situ comprising the steps of:

a) positioning a plurality of perforated electrodes in rows in said soil volume;

b) connecting the electrodes in a first row to a common coaxial cable shielding;

c) connecting the perforated electrodes in a second row to a common coaxial cable central conductor;

d) passing a radiofrequency (RF) excitation signal through the coaxial cable such that RF radiation is transmitted from the perforated electrodes into said contaminated soil causing the contaminant to be heated and vaporized, the RF excitation signal for each electrode in a row having the same phase, and the RF excitation signal for electrodes in a row having a phase 180° different from an adjacent row;

e) collecting the vaporized contaminant through the perforated electrodes; and f) neutralizing the vaporized contaminant.

* * * * *